US012243047B2

(12) United States Patent
Kieffer et al.

(10) Patent No.: US 12,243,047 B2
(45) Date of Patent: *Mar. 4, 2025

(54) RE-USING PAYMENT INSTRUMENTS FOR IN-STORE USE SYSTEMS AND METHODS

(71) Applicant: Walmart Apollo, LLC, Bentonville, AR (US)

(72) Inventors: Bradley Joseph Kieffer, Rogers, AR (US); Mark Matthews, Rogers, AR (US); Eytan Daniyalzade, San Francisco, CA (US); David Martin Nelms, Rogers, AR (US); Prasanna Rajendran, Bentonville, AR (US); Charles David Berry, Fayetteville, AR (US); Daniel Eckert, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,245

(22) Filed: Jan. 20, 2023

(65) Prior Publication Data
US 2023/0153793 A1    May 18, 2023

Related U.S. Application Data

(63) Continuation of application No. 15/767,487, filed as application No. PCT/US2015/055134 on Oct. 12, 2015, now Pat. No. 11,568,390.

(51) Int. Cl.
G06Q 20/36    (2012.01)
G06Q 20/02    (2012.01)
(Continued)

(52) U.S. Cl.
CPC .......... *G06Q 20/36* (2013.01); *G06Q 20/027* (2013.01); *G06Q 20/12* (2013.01); *G06Q 20/202* (2013.01);
(Continued)

(58) Field of Classification Search
CPC ...... G06Q 20/36; G06Q 20/027; G06Q 20/12; G06Q 20/202; G06Q 20/208; G06Q 20/32;
(Continued)

(56) References Cited

U.S. PATENT DOCUMENTS 6,993,507 B2   1/2006   Krouse
8,380,177 B2   2/2013   Laracey
(Continued)

FOREIGN PATENT DOCUMENTS

GB   2557541   6/2018
GB   2557542   6/2018
(Continued)

OTHER PUBLICATIONS

International Search Report and Written Opinion for Application No. PCT/US2018/058908, dated Jan. 16, 2019, 8 pages.
(Continued)

Primary Examiner — Florian M Zeender
Assistant Examiner — Kimberly S. Bursum
(74) Attorney, Agent, or Firm — Fitch, Even, Tabin & Flannery LLP

(57) ABSTRACT

Provided are a re-using e-commerce payment instruments for in-store purchasing systems and methods. A customer enters a check out and a transaction at the point of sale is started. The system receives a pairing request at a wallet processor from a customer mobile device operating a mobile application. This pairing request is created and sent in response to scanning of a code having a transaction identification. The system associates a customer payment profile with the transaction identification and sends associated information to the point of sale. The point of sale sends an amount of sale to authorize to the wallet processor after completing scanning of items. The system creates an autho- (Continued)

rization for payment and sending the authorization for payment to an authorizer. The transaction may then be completed by processing payment.

16 Claims, 5 Drawing Sheets

(51) Int. Cl.
  *G06Q 20/12*  (2012.01)
  *G06Q 20/20*  (2012.01)
  *G06Q 20/32*  (2012.01)
  *G06Q 20/40*  (2012.01)

(52) U.S. Cl.
  CPC ........... *G06Q 20/208* (2013.01); *G06Q 20/32* (2013.01); *G06Q 20/3276* (2013.01); *G06Q 20/40* (2013.01)

(58) Field of Classification Search
  CPC ... G06Q 20/3276; G06Q 20/40; G06Q 20/322
  See application file for complete search history.

(56) References Cited

U.S. PATENT DOCUMENTS

| | | | |
|---|---|---|---|
| 8,442,914 B2 | 5/2013 | Killian | |
| 8,498,900 B1 | 7/2013 | Spirin | |
| 8,571,985 B1 | 10/2013 | Grigg | |
| 8,720,771 B2 | 5/2014 | Mackinnon Keith | |
| 8,924,292 B1 | 12/2014 | Ellis | |
| 8,939,360 B2 | 1/2015 | Grossman | |
| 9,208,488 B2 | 12/2015 | Liberty | |
| 9,342,828 B2 | 5/2016 | Sanchez | |
| 9,430,768 B2 | 8/2016 | Graylin | |
| 9,589,266 B2 | 3/2017 | Pourfallah | |
| 10,192,210 B2 | 1/2019 | Baig | |
| 10,192,216 B2 | 1/2019 | Hammad | |
| 10,664,819 B1 | 5/2020 | Zafar | |
| 10,810,577 B2 | 10/2020 | Kieffer | |
| 11,568,390 B2 | 1/2023 | Kieffer | |
| 11,836,709 B2 | 12/2023 | Nelms | |
| 2005/0127167 A1 | 6/2005 | Nakajima | |
| 2009/0204530 A1 | 8/2009 | Hanson | |
| 2009/0307140 A1 | 12/2009 | Mardikar | |
| 2010/0138344 A1 | 6/2010 | Wong | |
| 2010/0320266 A1 | 12/2010 | White | |
| 2011/0251892 A1 | 10/2011 | Laracey | |
| 2012/0205445 A1 | 8/2012 | Rothschild | |
| 2012/0209749 A1 | 8/2012 | Hammad | |
| 2012/0234911 A1 | 9/2012 | Yankovich | |
| 2012/0253913 A1 | 10/2012 | Richard | |
| 2012/0284130 A1 | 11/2012 | Lewis | |
| 2013/0013490 A1 | 1/2013 | Keller | |
| 2013/0036048 A1 | 2/2013 | Campos | |
| 2013/0124413 A1 | 5/2013 | Itwaru | |
| 2013/0151360 A1 | 6/2013 | Scipioni | |
| 2013/0198076 A1 | 8/2013 | Zambelli Hosmer | |
| 2013/0238455 A1* | 9/2013 | Laracey | G06Q 20/102 |
| | | | 705/21 |
| 2013/0246259 A1 | 9/2013 | Dessert | |
| 2013/0262309 A1 | 10/2013 | Gadotti | |
| 2013/0262316 A1 | 10/2013 | Hruska | |
| 2013/0317928 A1 | 11/2013 | Laracey | |
| 2014/0006184 A1 | 1/2014 | Godsey | |
| 2014/0012701 A1* | 1/2014 | Wall | G06Q 20/3224 |
| | | | 705/26.8 |
| 2014/0067566 A1 | 3/2014 | Leyva | |
| 2014/0101036 A1 | 4/2014 | Phillips | |
| 2014/0180777 A1 | 6/2014 | Moshrefi | |
| 2014/0188645 A1 | 7/2014 | Dimokas | |
| 2014/0195422 A1 | 7/2014 | Zheng | |
| 2014/0195425 A1 | 7/2014 | Campos | |
| 2014/0222597 A1 | 8/2014 | Nadella | |
| 2014/0244514 A1 | 8/2014 | Rodriguez | |
| 2014/0249948 A1 | 9/2014 | Graylin | |
| 2014/0289061 A1 | 9/2014 | Zenou | |
| 2014/0291391 A1 | 10/2014 | Kumar | |
| 2014/0310174 A1 | 10/2014 | Heeter | |
| 2014/0330656 A1 | 11/2014 | Zhou | |
| 2014/0379532 A1 | 12/2014 | Agasti | |
| 2015/0006308 A1 | 1/2015 | Lin | |
| 2015/0006382 A1 | 1/2015 | Scipioni | |
| 2015/0026049 A1* | 1/2015 | Theurer | G06Q 20/36 |
| | | | 705/41 |
| 2015/0088674 A1 | 3/2015 | Flurscheim | |
| 2015/0170164 A1 | 6/2015 | Marsico | |
| 2015/0262174 A1 | 9/2015 | Mongillo, III | |
| 2016/0125417 A1 | 5/2016 | Huang | |
| 2016/0162882 A1* | 6/2016 | McClung, III | G06Q 20/352 |
| | | | 705/41 |
| 2016/0203352 A1 | 7/2016 | Marsico | |
| 2016/0275492 A1* | 9/2016 | Brickell | G06Q 20/3674 |
| 2016/0292677 A1 | 10/2016 | Karlsson | |
| 2016/0342991 A1 | 11/2016 | Narasimhan | |
| 2017/0053301 A1 | 2/2017 | Khan | |
| 2017/0061409 A1 | 3/2017 | Morecki | |
| 2017/0161728 A1 | 6/2017 | Satyanarayan | |
| 2017/0243190 A1 | 8/2017 | Kieffer | |
| 2017/0243206 A1 | 8/2017 | Kieffer | |
| 2017/0372301 A1 | 12/2017 | Theurer | |
| 2018/0165781 A1 | 6/2018 | Rodriguez | |
| 2018/0293573 A1* | 10/2018 | Ortiz | G06Q 20/102 |
| 2018/0300713 A1 | 10/2018 | Kieffer | |
| 2018/0374083 A1 | 12/2018 | Krishnaiah | |
| 2019/0197529 A1 | 6/2019 | Nelms | |
| 2019/0295054 A1* | 9/2019 | Purves | G06Q 20/28 |
| 2020/0175496 A1 | 6/2020 | Finke | |
| 2021/0004784 A1 | 1/2021 | Kieffer | |
| 2021/0019741 A1 | 1/2021 | Kurani | |
| 2024/0078535 A1 | 3/2024 | Nelms | |

FOREIGN PATENT DOCUMENTS

| | | |
|---|---|---|
| WO | 2017065733 | 4/2017 |
| WO | 2017065735 A1 | 4/2017 |
| WO | 2019125611 | 6/2019 |

OTHER PUBLICATIONS

USPTO; U.S. Appl. No. 16/179,029; Office Action mailed Oct. 5, 2021; (pp. 1-27).
USPTO; U.S. Appl. No. 16/179,029; Final Rejection mailed Feb. 10, 2022; (pp. 1-29).
Walmart Introduces Walmart Pay Pay with any iOS or Android smartphone, any major payment type and at any checkout lane—all through the Walmart app. Dec. 10, 2015 lhttps://corporate.walmart.com/newsroom/2015/12/10/walmart-introduces-walmart-pay (Year: 2015).
New Walmart Pay app adds to mobile payments fray Dec. 9, 2015 https://www.cnet.com/tech/mobile/walmart-joins-mobile-payments-fray-with-walmart-pay-app/(Year: 2015).
USPTO; U.S. Appl. No. 16/179,029; Non-Final Rejection mailed Feb. 15, 2023; (pp. 1-30).
International Preliminary Report on Patentability for PCT Application No. PCT/US2015/055134, mailed on Apr. 26, 2018.
Constine, Josh "CurrentC is the Big Retailers' Clunky Attempt to Kill Apply Pay and Credit Card Fees," TechCrunch.com, Oct. 25, 2014.
Gomzin, Slava "Mobile Checkout: Secure Mobile Payments," Gomzin.com, Apr. 2009.
Burelli, Francesco and Gina M. Lularevic "The New World of Retail: New Challenges and Opportunities for he retail industry in the digital age," MasterCard, May 6, 2015.
Apple Pay: Your wallet. Without the wallet. Apple.com, accessed on Jul. 22, 2015.
International Search Report & Written Opinion in International Patent Application No. PCT/US15/55134, mailed on Jan. 11, 2016; 13 pages.

(56) References Cited

OTHER PUBLICATIONS

USPTO; U.S. Appl. No. 15/767,487; Final Rejection mailed Dec. 17, 2021; (pp. 1-20).
USPTO; U.S. Appl. No. 15/767,487; Non-Final Rejection mailed May 26, 2022; (pp. 1-21).
IMPI; App No. MX/a/2018/004494; Office Action mailed Jul. 14, 2022; 7 pages.
USPTO; U.S. Appl. No. 15/767,487; Notice of Allowance and Fees Due (PTOL-85) mailed Oct. 17, 2022; (pp. 1-3).
IMPI; App. No. MX/a/2018/004494; Office Action mailed Oct. 12, 2023; (11 pages).
IMPI; App. No. MX/a/2018/004496; Office Action mailed Oct. 20, 2023; (13 pages).
IMPI; App. No. MX/a/2018/004496; Office Action mailed Apr. 11, 2024; (10 pages).
USPTO; U.S. Appl. No. 15/767,487; Final Office Action mailed Aug. 7, 2020; (19 pages).
USPTO; U.S. Appl. No. 15/767,487; Final Office Action mailed Dec. 17, 2021; (210 pages).
USPTO; U.S. Appl. No. 15/767,487; Non-Final Office Action mailed Feb. 6, 2020; (18 pages).
USPTO; U.S. Appl. No. 15/767,487; Non-Final Office Action mailed May 26, 2022; (21 pages).
USPTO; U.S. Appl. No. 15/767,487; Non-Final Office Action mailed Jun. 17, 2021; (20 pages).
USPTO; U.S. Appl. No. 15/767,487; Corrected Notice of Allowability mailed Oct. 17, 2022; (pp. 1-3).
USPTO; U.S. Appl. No. 15/767,487; Notice of Allowance and Fees Due (PTOL-85) mailed Sep. 22, 2022; (pp. 1-10).

\* cited by examiner

RE-USING PAYMENT INSTRUMENTS FOR IN-STORE USE SYSTEMS AND METHODS

CROSS-REFERENCE TO RELATED APPLICATIONS

This application is a continuation application of U.S. application Ser. No. 15/767,487, filed Apr. 11, 2018, which is a national stage entry of PCT/US2015/055134, filed Oct. 12, 2015, and the disclosures of which are incorporated by reference herein in their entirety.

FIELD OF THE INVENTION

The invention relates generally to payment instruments, and more specifically, to systems and methods for re-using e-commerce payment instruments for in-store purchasing of items.

BACKGROUND

Many customers have discount cards, membership cards, and payment instruments they carry in a wallet or purse. These customers may have already loaded their personal data, discount cards, membership card and payment instruments in their e-commerce/mobile customer profile with a particular business. Mobile electronic payment systems require customers to re-enter that information into an application or other system in order to provide payment in-store from a mobile application.

BRIEF SUMMARY

In one aspect, provided is a method for paying at a point of sale comprising: starting a transaction at the point of sale; receiving a pairing request at a wallet processor from a customer mobile device operating a mobile application in response to scanning of a code having a transaction identification; associating a customer payment profile with the transaction identification and sending associated information to the point of sale; sending an amount of sale to authorize to the wallet processor in response to completing scanning of items at the point of sale; creating an authorization(s) for payment and sending the authorization for payment to an authorizer; and completing the transaction by processing payment.

In another aspect, provided is a method for paying at a point of sale comprising: starting a transaction at the point of sale; receiving a pairing request at a wallet processor from a customer mobile device operating a mobile application in response to transmitting a transaction identification from a wireless device of the point of sale to the customer mobile device; associating a customer payment profile with the transaction identification and sending associated information to the point of sale; sending an amount of sale to authorize to the wallet processor in response to completing scanning of items at the point of sale; creating an authorization for payment and sending the authorization for payment to an authorizer; and completing the transaction by processing payment.

In another aspect, provided is a system for re-using e-commerce payment instruments for in-store purchasing, the system comprising: a backend system including a wallet processor and a memory, wherein the memory stores a customer payment profile comprising an already established e-commerce payment profile; a mobile device in communication with the wallet processor; a point of sale in communication with the wallet processor and the mobile device, wherein the mobile device operates a mobile application to communicate with the wallet processor to associate a transaction identification from the point of sale with the customer payment profile; and an authorizer for authorizing a payment of an amount of sale in response to receiving the amount of sale from the wallet processor.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Many store customers have times when they shop online and other times when they are physically present at a brick-and-mortar store. In order to shop online, a customer must establish an e-commerce account with the particular business which often includes entering and storing payment instruments in a database for use with the that particular business. This provides ease of checking out at the end of an online shopping session, wherein the customer can simply execute a few mouse clicks or other input, such as use of a touchscreen and the like, to execute payment to complete an online transaction. Sometimes the payment instruments are stored for future re-use as part of checking out and completing an order.

Shopping in a brick-and-mortar store requires the customer must move around and peruse items and goods with the store, select the goods, often putting them within a cart and then proceeding to a checkout line, where a point of sale terminal is then used to scan or otherwise total the amount of money due to purchase the items. The customer must then retrieve the payment instrument from his or her wallet or purse and provide the payment instrument to the point of sale terminal. If a payment card is the type of payment instrument, the card is either swiped by the customer or the employee at the checkout and the payment is processed either by entering a personal identification number ("PIN") or signing to authorize the payment, thus completing the transaction.

Online customers enjoy an expedient check out that is typically not offered at a brick-and-mortar store. The present inventive concepts provide the benefits of online checkout processes with in-store shopping without the need for re-entering payment instruments within a mobile application on a mobile device. For example, the customer can use a payment instrument already saved in the customer's e-commerce account with a business to pay for a transaction that occurs in a brick-and-mortar store of the same business.

Figure 1:
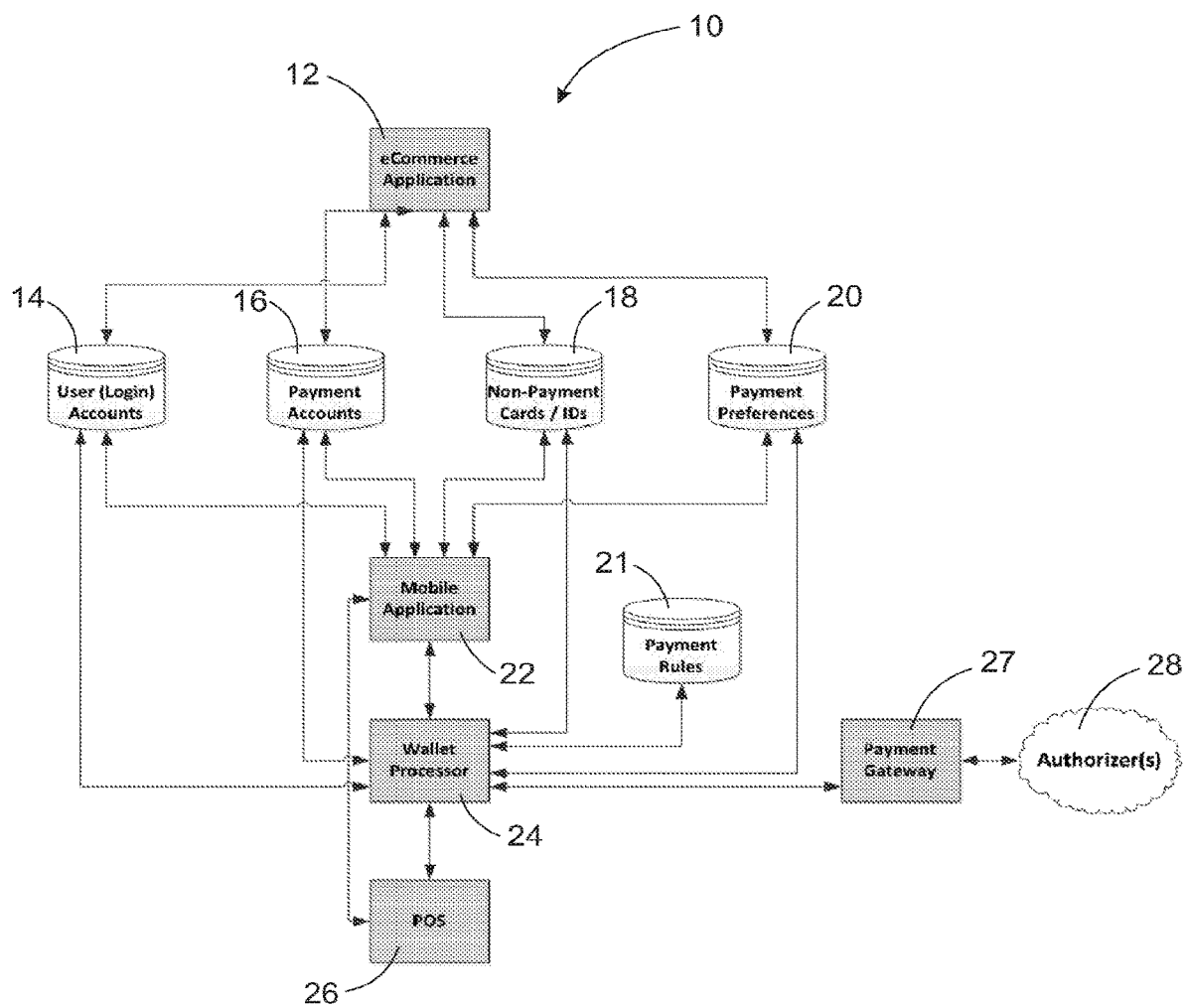
FIG. 1 is a block diagram of a system for re-using e-commerce payment instruments for in-store purchasing, in accordance with embodiments.

FIG. 1 is a block diagram of a system 10 for re-using e-commerce payment instruments for in-store purchasing. The system 10 may include a backend system having various databases, such as, but not limited to user accounts 14, payment accounts 16, non-payment cards/identifiers 18, payment preferences 20, and payment rules 21. These databases 14, 16, 18 and 20 are accessible from an e-commerce application 12. Further, the databases 14, 16, 18 and 20 are accessible from a mobile application 22. The system 10 may also include a wallet processor 24, a point of sale ("POS") 26, a payment gateway 27 and an authorizer(s) 28. The wallet processor 24 may have access to payments accounts 16, non-payment cards/identifiers 18, payment preferences 20, and payment rules 21 databases. The e-commerce application 12 may be accessible through a computing device, such as but not limited to a computer, a laptop, a tablet, a smartphone and the like. The e-commerce application 12 may be an e-commerce website accessible through an Internet connection. The mobile application 22 may be accessible through a mobile device, such as a smartphone, a tablet and the like. The mobile application 22 may be a downloadable application that is installed and operated on the mobile device. The payment gateway 27 may operate to send messages routed to the authorizers 28.

Figure 2:
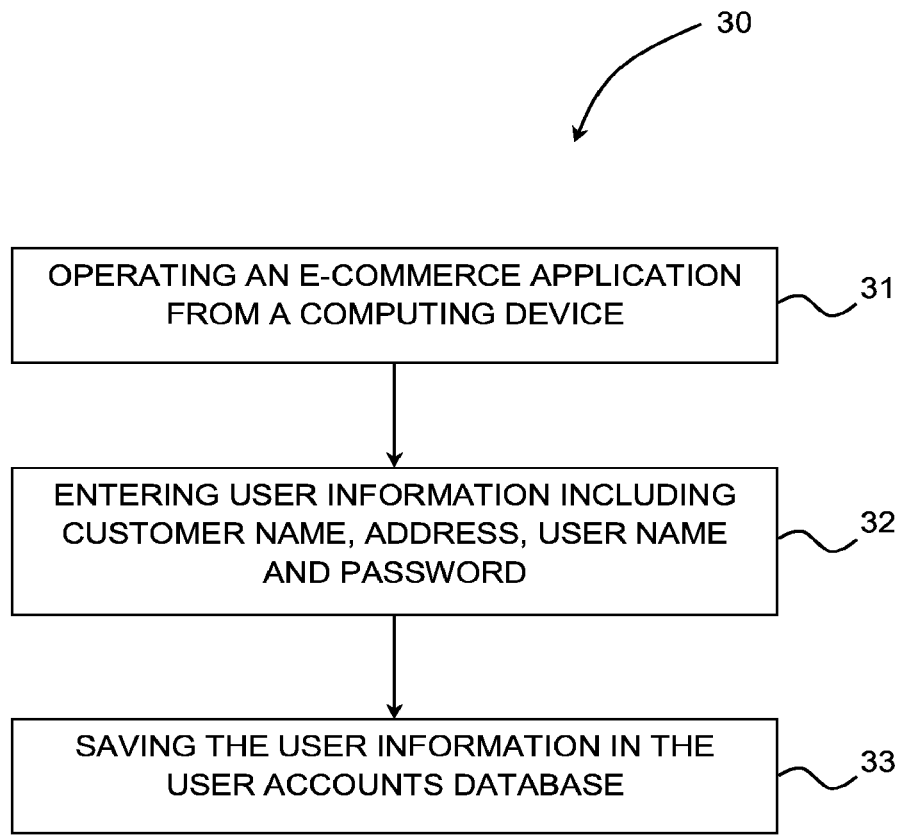
FIG. 2 is a flow diagram illustrating a method for creating an e-commerce account, in accordance with some embodiments.

Referring additionally to FIG. 2, the system 10 may be utilized to execute a method 30 of creating an e-commerce account. The method 30 may include operating an e-commerce application 12 from a computing device (Step 31); entering user information including customer name, address, user name and password (Step 32); and saving the user information in the user accounts 14 database (Step 33). The method 30 may further include entering a payment instrument information through the e-commerce application 45 and storing the payment instrument information in the payment accounts 16 database. The method 30 may also include entering non-payment card/identifier information through the e-commerce application 12 and storing the non-payment card/identifier information in the non-payment cards/identifier 18 database. It will be understood that the method 30, in some embodiments, is a precondition to using the system to complete a transaction at a POS 26.

Further, access to the user accounts 14, payment accounts 16, non-payment cards/identifiers 18 and payment preferences 20 databases are secured by restricting access to the information. The username and password stored in the user accounts 14 database includes the information that must be input through a user graphical interface in order for a customer to login to his or her e-commerce account to access, update, change and the like the information stored in the user accounts 14, payment accounts 16, non-payment cards/identifiers 18, and payment preferences 20 databases. The customer may login to the e-commerce account through the e-commerce application 12 or through the mobile application 22.

It is anticipated that the user account 14 may be changed and updated at any time through use of the e-commerce application 12 or the mobile application 22. For example, address information may be updated, additional payment instruments may be added to the payment accounts 16, and additional non-payment cards may be added to the non-payment cards/identifier 18. Further, as payment instruments expire, the payment instrument information stored in the payment accounts 16 may be updated or removed.

Figure 3:
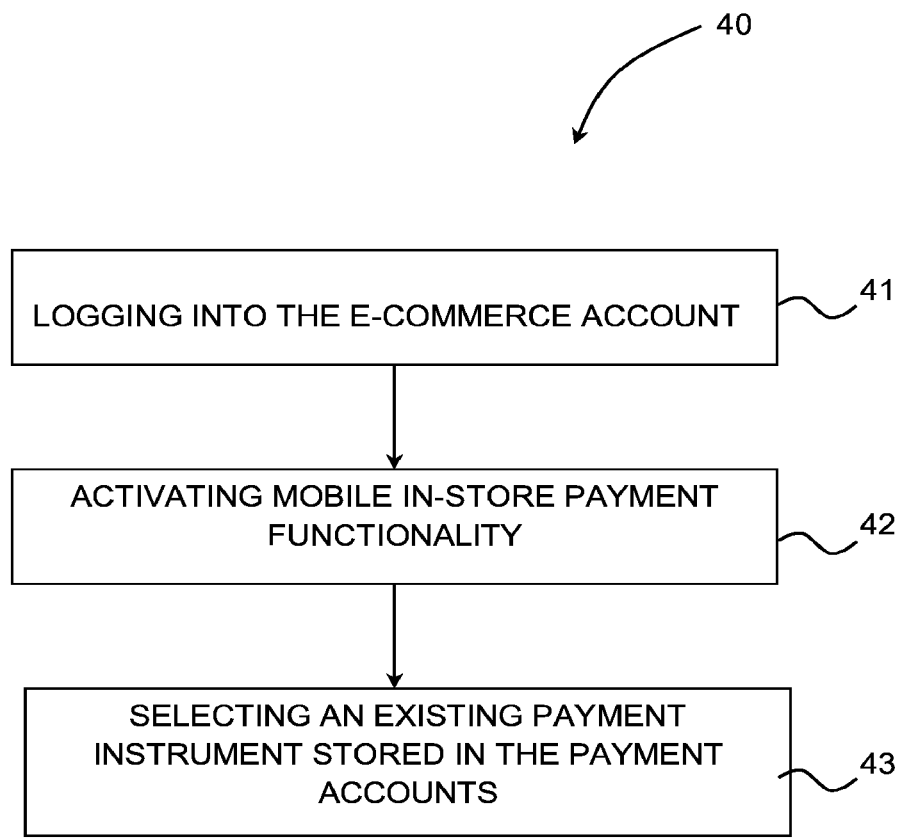
FIG. 3 is a flow diagram illustrating a method for setting up e-commerce payments instruments for use in-store, in accordance with some embodiments.

FIG. 3 depicts a method 40 of setting up e-commerce payments instruments for in-store use. For example, the method 40 may include logging into the e-commerce account (Step 41) through the mobile application 22 or through the e-commerce application 12; activating mobile in-store payment functionality (Step 42), wherein activating the mobile in-store payment functionality requires creating a new payment authentication code, such as a PIN, password and the like; and selecting an existing payment instrument stored in the payment accounts 16 for use in mobile in-store payment (Step 43). This information may be stored in the payment preferences 20.

Step 43 of selecting an existing payment instrument may be repeated to select multiple payment instruments for use with mobile in-store payments. If multiple payment instruments are selected, the customer may also indicate how he or she prefers to use the payment instruments when conducting transactions in the store.

The method 40 may also include entering a new payment instrument through the mobile application 22 and indicating if it may also be used for e-commerce transactions and/or how the customer prefers to use the payment instrument when transacting in the store.

The method 40 may also include presenting a list of existing non-Payment cards/identifiers (e.g. Membership, Loyalty, Discount, Offers) to a customer and selecting which non-payment cards/identifiers to load for mobile in-store processing. This may be repeated if there are multiple non-payment cards on file. The method may also include entering new non-Payment cards/identifiers to the non-payment cards/identifiers 18 database and selecting it to be used for e-commerce transactions or when transacting in the store.

Figure 4:
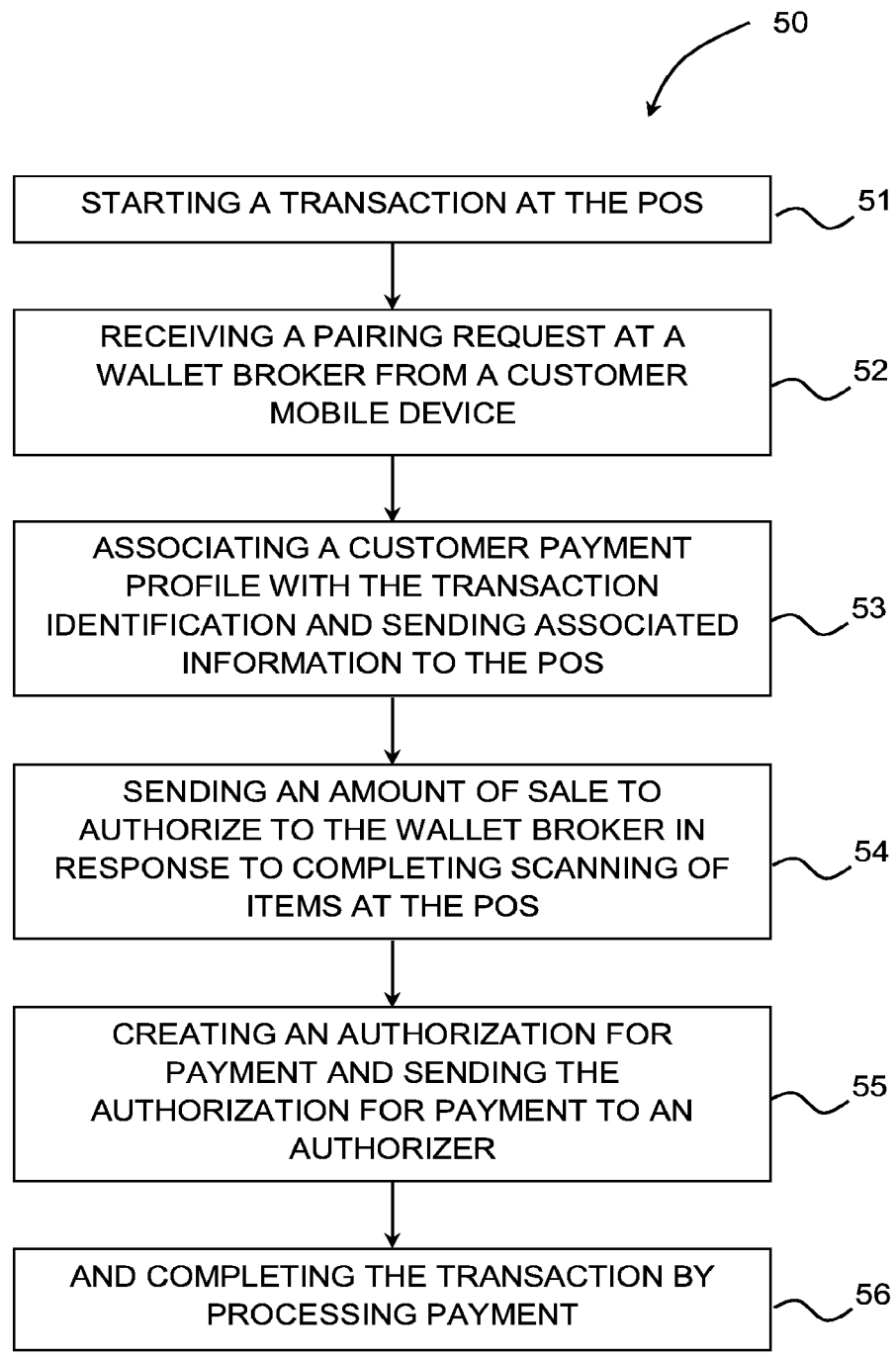
FIG. 4 is a flow diagram illustrating a method for executing a transaction at a store checkout using a system for re-using e-commerce payment instruments for in-store purchasing, in accordance with some embodiments.

FIG. 4 depicts a method 50 for executing a transaction at a store checkout using a system for re-using e-commerce payment instruments for in-store purchasing. The method 50 may include starting a transaction at the POS 26 (Step 51); receiving a pairing request at a wallet processor 24 from a customer mobile device operating a mobile application 22 in response to scanning of a code having a transaction identification (Step 52); associating a customer payment profile with the transaction identification and sending associated information to the POS (Step 53); sending an amount of sale to authorize to the wallet processor in response to completing scanning of items at the POS (Step 54); creating an authorization for payment and sending the authorization for payment to an authorizer 28 (Step 55); and completing the transaction by processing payment (Step 56).

In a method 50, the customer payment profile may comprise an already established e-commerce payment profile stored in a payment preferences 20 database. Further, the customer payment profile may further comprise one or more payment instruments stored in the payment accounts 16 database.

The scanning of the code of Step 52 may include scanning the code generated by the POS 26. In another embodiment, scanning the code may comprise scanning the code generated by the customer mobile device with a scanning device at the POS 26.

The method 50 may further comprise designating one payment instrument of the one or more payment instruments in the customer payment profile as a default payment instrument prior to starting the transaction. The method 50 may also comprise alerting the wallet processor that the transaction is complete; and alerting the mobile device from the wallet processor that the transaction is complete.

Figure 5:
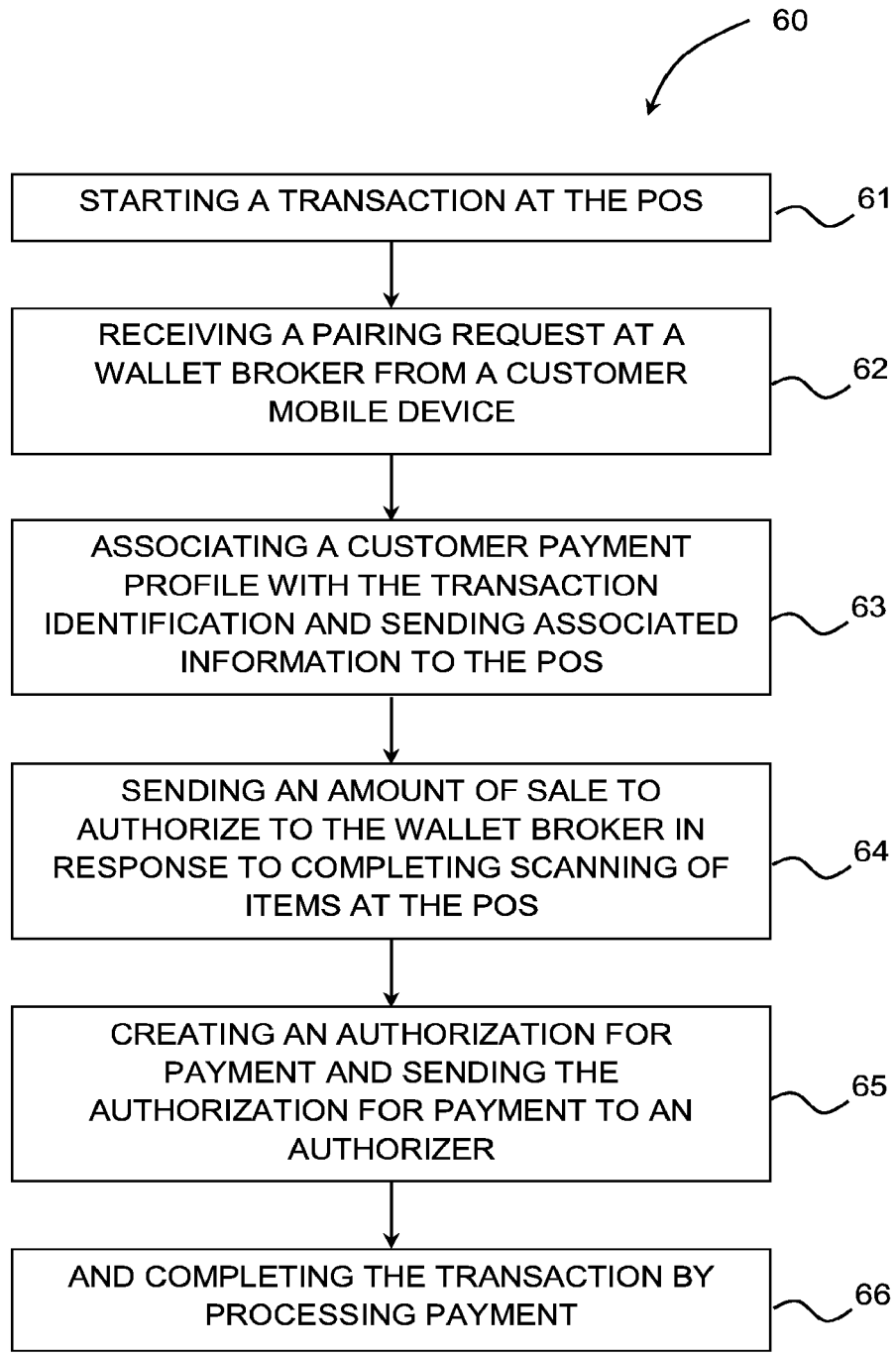
FIG. 5 is a flow diagram illustrating another method for executing a transaction at a store checkout using a system for re-using e-commerce payment instruments for in-store purchasing, in accordance with some embodiments.

FIG. 5 depicts a method 60 for executing a transaction at a store checkout using a system for re-using e-commerce payment instruments for in-store purchasing in accordance with embodiments. A method 60 may include starting a transaction at the POS 26 (Step 61); receiving a pairing request at a wallet processor from a customer mobile device operating a mobile application in response to transmitting a transaction identification from a wireless device of the POS 26 to the customer mobile device (Step 62); associating a customer payment profile with the transaction identification and sending associated information to the POS 26 (Step 63); sending an amount of sale to authorize to the wallet processor in response to completing scanning of items at the POS 26 (Step 64); creating an authorization for payment and sending the authorization for payment to an authorizer 28 (Step 65); and completing the transaction by processing payment (Step 66).

In method 60 the customer payment profile comprises an already established e-commerce payment profile stored in a payment preferences 20 database. The customer payment profile may also comprise one or more payment instruments stored in a payment accounts 16 database.

The method 60 may further comprise designating one payment instrument of the one or more payment instruments in the customer payment profile as a default payment instrument prior to starting the transaction. The method 60 may also comprise alerting the wallet processor that the transaction is complete and alerting the mobile device from the wallet processor that the transaction is complete.

Transmitting the transaction identification from the wireless device to the customer mobile device of Step 63 comprises transmitting with a Bluetooth low energy communication. Further, transmitting the transaction identification from the wireless device to the customer mobile device may comprise transmitting with a near field communication. Further still, transmitting the transaction identification from the wireless device to the customer mobile device comprises transmitting data with a radio frequency communication.

Step 65 of sending an authorization for payment to the authorizer 28 may also include sending an authorization for payment to a payment gateway 27. The payment gateway 27 may then send the authorization for payment to the authorizer(s) 28. The payment gateway 27 may operate to control the sending of the authorizations to the authorizer(s) 28.

Referring additionally to FIG. 1, in performing the method 50, the POS 26 creates a unique transaction/basket ID. The POS 26 may display a code, such as a one-dimensional barcode or QR code that includes the unique transaction/basket ID for the customer to capture with his or her mobile device operating the mobile application 22. In some other embodiments, the unique transaction/basket ID may be transmitted wirelessly (e.g. BLE), to the customer's mobile device.

In order for the customer's mobile device to scan the code from the display, a customer may log in using the mobile application operating on the mobile device and navigates to a payment feature. The customer may then provide the Payment Authentication Code (e.g. PIN, password, etc.) in order to validate the payment feature. The customer may then capture transaction/basket ID from the code created by the POS 26.

In order for the customer's mobile device to obtain the unique transaction/basket ID wirelessly, a wireless message is sent from the POS 26 to the mobile device of the customer. When the message is received, the customer is asked through the mobile device operating the mobile application 22 if he or she wishes to use the payment feature. If the customer wishes to use the payment feature, the customer may select so using the mobile application and the mobile application 22 automatically navigates to the payment feature and the customer may provide the Payment Authentication Code (e.g. PIN, password, etc.) in order to validate the payment feature.

The mobile application 22 alerts the wallet processor 24 of a pairing request, wherein the wallet processor 24 gathers customer/payment/card data and sends the customer/payment/card data to the POS 26. The POS 26 completes scanning items and sends amount to authorize to wallet processor after verbal confirmation of the amount to be paid by the customer.

The wallet processor 24 uses the payment preferences, payment rules 21 and payment instruments to create one or more authorizations and sends them to the authorizer 28. The wallet processor 24 then sends the responses to the POS 26. The POS 26 completes the transactions and alerts the wallet processor 24 that the transaction is complete. The wallet processor 24 may then alert the mobile device that the transaction is complete in order to alert the customer.

In another embodiment, a customer may log in using a mobile application 22 and navigate to a payment feature. The customer may then provide Payment Authentication Code (e.g. PIN, password, etc.) in order to validate the payment feature. The mobile application 22 may then retrieve a transaction/basket ID from the wallet processor 24. The mobile application 22 encodes the transaction/basket ID and displays either one-dimensional barcode or QR code having the transaction/basket ID. The POS 26 may then scan the transaction/basket ID.

The POS 26 alerts the wallet processor 24 of a pairing request, and the wallet processor gathers customer/payment/card data and sends the customer/payment/card data to the POS 26. The POS 26 may complete scanning items and send an amount owed to be authorized to the wallet processor 24. The wallet processor 24 uses the payment instruments stored in the payment accounts 16, payment preferences 20 and payment rules 21 databases to create one or more authorizations and send them to the authorizer 28. The wallet processor 24 sends responses to the POS 26. The POS 26 completes the transaction and alerts the wallet processor 24 that the transaction is complete. The wallet processor 24 may then alert the mobile device that the transaction is complete in order to alert customer.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), solid-state drives (SSD), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a wireless network, a cellular data network, a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for paying at a point of sale, comprising:
receiving, from a mobile device via a mobile application of a business for in-store payments, user login associated with an account stored in a user accounts database of the business, the account being previously established with the business for making purchases from the business and includes a payment profile;
retrieving, from a payment accounts database of the business, payment instrument information from the payment profile;
causing the mobile application to display for selection, one or more payment instruments associated with the payment profile to add as an in-store payment instrument;
receiving, via the mobile application, a selection to use a payment instrument from the payment profile for in-store payments at a brick-and-mortar store of the business;
storing, in a payment preferences database of the business, the payment instrument selected from the payment profile as a default payment instrument of the account for in-store payments at the business, wherein information associated with the account in the user accounts database, the payment accounts database, and the payment preferences database are secured for access by the user login associated with the account established with the business;
starting a transaction at the point of sale in the brick-and-mortar store of the business;
receiving, at a wallet processor, a pairing request identifying the account logged into the mobile application using the user login;
associating the payment profile with the transaction, wherein the payment profile comprises information associated with the payment instrument according to the payment preferences database for in-store payments;
sending an amount of sale to authorize to the wallet processor in response to completing scanning of items at the point of sale;
creating an authorization for payment and sending the authorization for payment to an authorizer; and
completing the transaction by processing payment.

2. The method of claim 1, wherein the payment profile comprises the one or more payment instruments.

3. The method of claim 1, wherein sending an authorization for payment to the authorizer comprises sending the authorization for payment to a payment gateway, wherein the payment gateway sends the authorization for payment to the authorizer.

4. The method of claim 1, further comprising alerting the wallet processor that the transaction is complete.

5. The method of claim 4, further comprising alerting the mobile device from the wallet processor that the transaction is complete.

6. The method of claim 1, wherein associating the payment profile with the transaction is based on the user device scanning a code generated by the point of sale.

7. The method of claim 1, wherein associating the payment profile with the transaction is based on the user point of sale scanning a code generated by the mobile device with a scanning device of the point of sale.

8. A method for paying at a point of sale, comprising:
receiving, from a mobile device via a mobile application for in-store payments, user login associated with an account stored in a user accounts database of a business, the account being previously established with the business for making purchases from the business and includes a payment profile;
retrieving, from a payment accounts database of the business, payment instrument information from the payment profile;
causing the mobile application to display for selection, one or more payment instruments associated with the payment profile to add as an in-store payment instrument;
receiving, via the mobile application, a selection to use a payment instrument from the payment profile for in-store payments at a brick-and-mortar store of the business;
storing, in a payment preferences database of the business, the payment instrument selected from the payment profile as a default payment instrument of the account for in-store payments at the business, wherein information associated with the account in the user accounts database, the payment accounts database, and the payment preferences database are secured for access by the user login associated with the account established with the business;
starting a transaction at the point of sale in the brick-and-mortar store of the business;
receiving, at a wallet processor, a pairing request identifying the account logged into the mobile application using the user login;
associating the payment profile with the transaction, wherein the payment profile comprises information associated with the payment instrument according to the payment preferences database for in-store payments;
sending an amount of sale to authorize to the wallet processor in response to completing scanning of items at the point of sale;
creating an authorization for payment and sending the authorization for payment to an authorizer; and
completing the transaction by processing payment.

9. The method of claim 8, wherein the payment profile comprises one or more payment instruments.

10. The method of claim 8, wherein sending an authorization for payment to the authorizer comprises sending the authorization for payment to a payment gateway, wherein the payment gateway sends the authorization for payment to the authorizer.

11. The method of claim 8, further comprising alerting the wallet processor that the transaction is complete.

12. The method of claim 8, further comprising alerting the mobile device from the wallet processor that the transaction is complete.

13. A system for re-using payment instruments for in-store purchasing, the system comprising:
a backend system including a wallet processor and a memory, wherein the memory stores a user accounts database, a payment accounts database, and a payment preferences database of a business, and wherein the backend system is configured to:
receive, from a mobile device via a mobile application for in-store at the business, user login associated with an account stored in the user accounts database of the business, the account being previously established with the business for making purchases from the business and includes a payment profile;
retrieve, from the payment accounts database of the business, payment instrument information from the payment profile;
cause the mobile application to display for selection, one or more payment instruments associated with the payment profile to add as an in-store payment instrument;
receive, via the mobile application, a selection to use a payment instrument from the payment profile for in-store payments at a brick-and-mortar store of the business; and
store, in the payment preferences database of the business, the payment instrument selected from the payment profile as a default payment instrument for in-store payments at the business, wherein information associated with the account in the user accounts database, the payment accounts database, and the payment preferences database are secured for access by the user login associated with the account established with the business; and
a point of sale in the brick-and-mortar store of the business in communication with the wallet processor and the mobile device,
wherein the wallet processor is configured to associate a transaction from the point of sale with the payment profile of the account logged into the mobile application using the user login.

14. The system of claim 13, wherein the memory of the backend system further includes a non-payment cards/identifiers database.

15. The system of claim 14, wherein the wallet processor accesses the user accounts database, the payment accounts database, the non-payment cards/identifiers database, payment rules database and the payment preferences database to obtain the payment profile.

16. The system of claim 13, further comprising a payment gateway, wherein the payment gateway receives authorizations for payment and sends the authorizations for payment to an authorizer.

* * * * *